Figure 1:
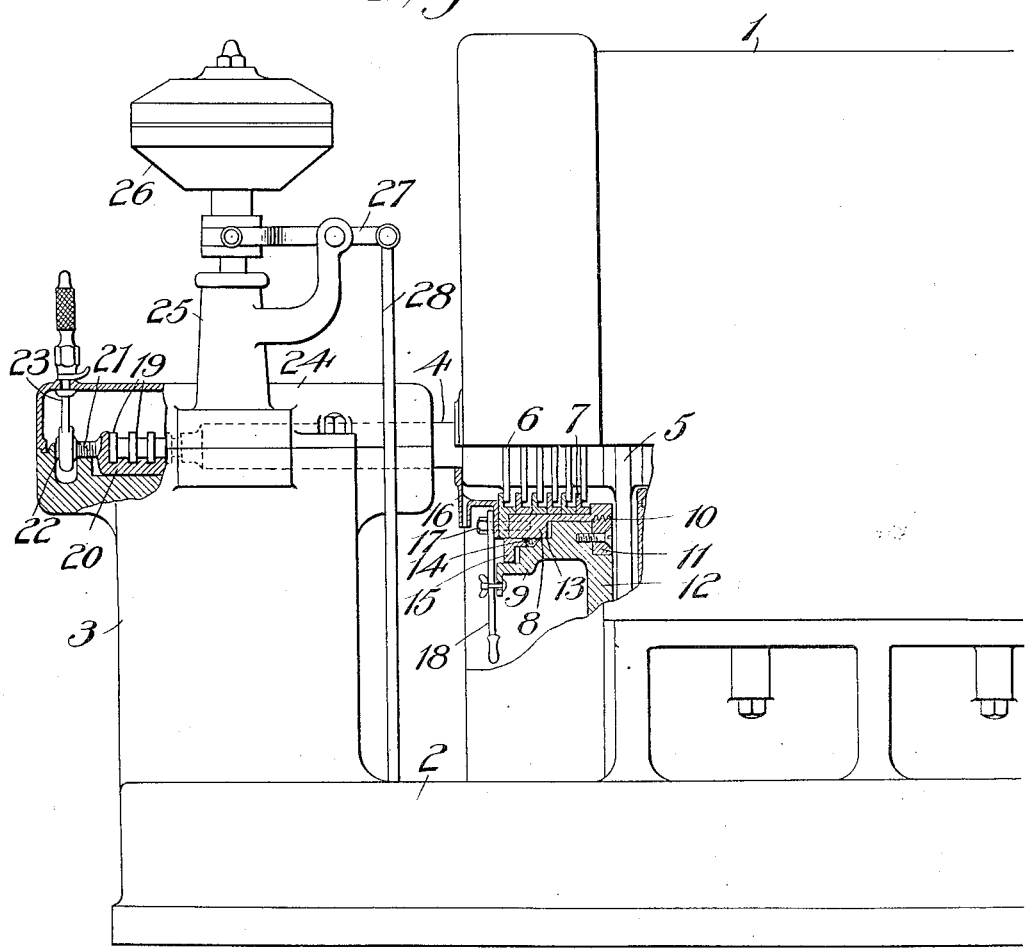

No. 822,800. PATENTED JUNE 5, 1906.
J. WILKINSON.
TURBINE SHAFT PACKING.
APPLICATION FILED JULY 3, 1905.

WITNESSES:
Edwin L. Bradford
P. H. Burch

INVENTOR
James Wilkinson
BY
Robt. D. Johnston Jr.
ATTORNEY

UNITED STATES PATENT OFFICE.

JAMES WILKINSON, OF PROVIDENCE, RHODE ISLAND, ASSIGNOR TO WILKINSON TURBINE COMPANY, A CORPORATION OF ALABAMA.

TURBINE-SHAFT PACKING.

No. 822,800.           Specification of Letters Patent.           Patented June 5, 1906.

Application filed July 3, 1905. Serial No. 268,206.

*To all whom it may concern:*

Be it known that I, JAMES WILKINSON, a citizen of the United States, residing at Providence, in the county of Providence and State of Rhode Island, have invented new and useful Improvements in Turbine-Shaft Packing, of which the following is a specification.

My invention relates to improvements in packing means for the shafts of elastic-fluid turbines and rotary motors.

My invention relates more particularly to that class of packing comprising rotating and stationary parts, such as interleafed glands or rings alternately mounted on the shaft and motor-casing. The effectiveness of this type of packing is dependent upon the adjustment of the stationary and rotating parts and is directly proportioned to the proximity at which the contact-faces of these parts can be maintained consistent with safety. The high speeds of shaft rotation in this type of motor will cause considerable heat to result from even the slightest frictional engagement between the moving and stationary parts of the packing, and as this heat is imparted to the glands or ring-supports a change in the dimension of these parts will occur.

It is one object of my invention to utilize this expansion of parts due to the friction heat from the packing to automatically move the contact-faces in the packing apart, thereby reducing the friction and rendering the packing much safer and more effective. To this end I mount or form the stationary rings in a nest or gland secured at its inner end to the turbine-casing, and therefore free to expand outwardly therefrom when heated. The rotating rings or gland is carried by the turbine-shaft, which is mounted in a thrust-bearing, so that its expansion will cause the rings or gland to be moved toward the turbine. The rings and interleaved glands are so disposed relatively that their contact-faces will be moved farther apart as their supports expand and closer together as they contract. This automatic adjustment of the packing responsive to its friction heat enables me to arrange the moving and stationary parts more closely together than is safe with ring-packings as now used, thereby insuring better results and avoiding the injury or destruction of parts resulting from excessive friction.

It is a further object of my invention to provide novel means for positively and readily adjusting the packing so as to regulate the clearance between the moving and stationary parts, this being effected, preferably, by connecting the nest or gland for the stationary parts by means of screw-threads to the casing, so that it can be moved relatively thereto by rotating it. This adjustment, however, may be effected by various other instrumentalities which act to the same end as and are the equivalents of the preferred screw-adjusting means.

My invention further comprises improvements in the construction of thrust-bearings for turbine-shafts and means to adjust the shaft and bucket-wheels in the turbine.

The details of construction constituting an illustrative embodiment of my invention are shown in the accompanying drawings, in which—

Figure 2:
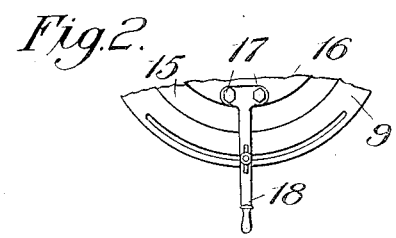

Figure 1 is a partial side view of a turbine and a shaft-bearing for its high-pressure end, the turbine casing and bearing being broken away to illustrate the packing devices and the shaft-adjusting means. Fig. 2 is a partial end view of the screw-adjusted nest or ring support and the operating means therefor.

Similar reference-numerals refer to similar parts throughout the drawings.

Though applicable to any type of turbine or rotary motor, I have illustrated my invention in connection with a turbine of the horizontal multistage type having a casing 1, suitably mounted upon a bed-plate 2, which also supports the bearing-standard 3 for the shaft 4. A plurality of wheels 5 are mounted on this shaft and acted upon by the fluid-pressure in accordance with the common practice, the nozzles and fluid-controller means not being shown, as they form no part of my present invention.

The packing means for the shaft comprise a plurality of rings 6, formed integral with or secured to shaft 4 and rotatable therewith. A corresponding number of rings 7 are mounted in a shell or nest 8, inserted in a stuffing-box 9 and provided with screw-threads 10 at its inner shouldered end which mesh with the threads of a nut 11, bolted or otherwise secured to the inner face of the supply-head 12. The nut 11 is preferably mounted in a recess formed in the head and surrounding the enlarged shaft-opening therein. The stuffing-box is enlarged near its outer end to receive the shouldered portion 13 of the nest or casing 8, which serves to stop its inward adjustment. Packing 14, retained in place by a ring 15, surrounds the outer end of the nest 8 and prevents the escape of pressure which leaks past the threads 10 between the nest and the stuffing-box. The outer ring 7 is provided with a flange which overhangs the outer end of the nest 8 and which with the drip-gland 16 is secured to the nest by bolts 17. This drip-gland surrounds the outer reduced end of the shaft 4.

A handle 18, clamped to the stuffing-box 9, is connected at its inner end to the gland 16 or to the nest 8. The slot in the flange of the stuffing-box for the lever-clamp is elongated, so that it can be swung through a considerable arc to rotate the whole nest, thereby moving it inwardly or outwardly in the stuffing-box by the screw action of the threads 10 in the nut 11. The clamp will hold the lever and nest in any desired adjustment. This enables me to move the stationary rings 7 to and from the contact-faces of the rotating rings 6, it being noted that the outward movement of the stationary rings relatively to the rotating rings will act to separate them. The nest 8 for the stationary rings is connected only at its inner end to the casing, and is therefore free to expand outwardly when heated by the friction in the packing, and this heat, having the effect of expanding the shell, will tend to move the rings 7 farther away from the rotating rings 6, thereby reducing the friction in the packing. This friction heat in the packing will be transmitted by the rings 6 to the shaft, and I provide the following means for utilizing the consequent expansion of the shaft to further reduce the friction in the packing. The outer end of the shaft 4 is reduced to form a plurality of collars 19, which rest on an adjustable thrust-bearing sleeve 20, supported on the bearing-standard 3. This sleeve is provided with a threaded shank 21, with which a nut 22 meshes. This nut engages the pedestal-frame to prevent its shifting axially and is adapted to be operated by a wrench 23, by means of which the sleeve 20 may be adjusted to and from the turbine. The sleeve 20 is provided with the usual channels, in which the thrust-collars 19 are disposed, and its adjustment will tend to move the shaft and bucket-wheels 5 axially. This thrust-bearing will cause the shaft 4 as it is heated up by the friction in the packing to expand toward the turbine, or, in other words, the heating of the shaft will cause a slight increase in its length between the thrust-bearing and the rings 6. The relative position of the rings 6 to the stationary rings 7 will cause this expansion to decrease their frictional engagement. The change in the dimensions of the supports for the stationary and movable parts of the packing, due to their becoming heated by too great a friction in the packing, will thus cause an automatic adjustment of the parts of the packing calculated to reduce this friction. The top plate 24 of the bearing has mounted thereon standards 25, supporting the governor 26, which acts through arms 27 and 28 to regulate the supply of fluid to the turbine by devices not shown. The wrench 23 is operated by a handle which projects above the top plate of the bearings.

Interleafed packing-glands may be substituted for the separate ring devices shown, and the number, arrangement, and construction of the packing rings or devices may be varied in any manner as now practiced in the art. It is my purpose in this application to protect broadly the construction by means of which an automatic adjustment of the stationary and rotating parts of the shaft-packing is effected by the heat resulting from undue friction in the packing.

Having thus described my invention, what I claim as new, and desire to secure by Letters Patent, is—

1. In a rotary motor, shaft-packing comprising rotatable and normally stationary parts, and means to automatically adjust said parts away from each other when heated by their friction.

2. In a rotary motor, a shaft, and packing therefor comprising moving and normally stationary parts, supports for said parts which when heated by the latter's friction, act automatically as they expand and contract to regulate the clearances between the parts of the packing.

3. A turbine-shaft packing comprising alternate rotatable and normally stationary rings, a support for the latter rings adapted to expand away from the turbine when heated and move said stationary rings to lessen their frictional contact with rotatable rings.

4. The combination with a turbine, a revoluble shaft therefor and an axially-adjustable thrust-bearing at the high-pressure end of said shaft, of a stuffing-box comprising rings revoluble with the shaft, rings connected to the turbine and in lateral engagement with said revoluble rings, the engaging faces of said rings being adapted to be separated by the expansion of their supports.

5. In a rotary motor, a shaft, a packing therefor comprising a plurality of rings rotatable with said shaft, a plurality of rings interposed between said rotatable rings and carried by a support fixed at its inner end to the motor, the inner faces of the fixed rings being arranged to coact with the outer faces of the rotatable rings, and a thrust-bearing for the shaft which causes expansion thereof to coöperate with the expansion of said ring-support to separate the coacting faces of the packing-rings.

6. In a rotary motor, a shaft-packing comprising rotatable and non-rotatable sets of rings, a supporting element for one set of rings provided with threads by means of which it is adjustably connected to the motor.

7. In a turbine, a shaft, a stuffing-box, rotatable rings carried by said shaft and disposed within said box, normally stationary rings in said box adapted to engage the outward faces of the rotatable rings, a support for said stationary rings which is provided with threads and adapted to be screwed into said stuffing-box, and packing interposed between said support and box.

8. In a turbine, a shaft, a supply-head through which said shaft passes, a stuffing-box carried by said head and formed with a shoulder, and packing devices therein comprising a gland adjustably secured in position in said box by screw-threads, and a shoulder on said gland adapted to engage said shoulder in said box and limit the adjustment of said gland in one direction.

9. A stuffing-box for revoluble shafts comprising alternating stationary and revoluble rings in lateral engagement, a fixed and a revoluble support for said rings adapted to automatically separate said rings when heated by their friction, and means to positively adjust said supports to regulate the normal clearances between said rings.

In testimony whereof I have hereunto set my hand in presence of two subscribing witnesses.

JAMES WILKINSON.

Witnesses:
JAMES H. NOLAN,
WILLIAM P. NOLAN.